United States Patent [19]
Evenson et al.

[11] Patent Number: 5,235,801
[45] Date of Patent: Aug. 17, 1993

[54] ON/OFF SURGE PREVENTION CONTROL FOR A VARIABLE GEOMETRY DIFFUSER

[75] Inventors: Kenneth W. Evenson, Scottsdale; Daniel J. Kuhn, Phoenix; Thomas Nesdill, Scottsdale; Robert B. Sumegi, Phoenix, all of Ariz.

[73] Assignee: Allied-Signal Inc., Morris Township, Morris County, N.J.

[21] Appl. No.: 805,661

[22] Filed: Dec. 12, 1991

[51] Int. Cl.$^5$ .............................. F02C 9/00; F02G 3/00
[52] U.S. Cl. .................................. 60/39.02; 60/39.29; 415/26
[58] Field of Search .......................... 60/39.02, 39.29; 415/26, 27, 28

[56] References Cited

U.S. PATENT DOCUMENTS

| | | | |
|---|---|---|---|
| 4,060,980 | 12/1977 | Elsaesser et al. | 60/39.29 |
| 4,164,034 | 8/1979 | Glennon et al. | 60/39.29 |
| 4,405,290 | 9/1983 | Rannenberg | 415/27 |
| 4,428,194 | 1/1984 | Stokes et al. | 415/27 |
| 4,460,310 | 7/1984 | Plunkett | 415/26 |
| 4,503,684 | 3/1985 | Mount et al. | 62/115 |
| 4,586,870 | 5/1986 | Hohlweg et al. | 415/26 |
| 4,603,546 | 8/1986 | Collins | 60/39.29 |
| 4,936,741 | 6/1990 | Blotenberg | 415/27 |
| 5,012,637 | 5/1991 | Dubin et al. | 60/39.02 |
| 5,042,245 | 8/1991 | Zickwolf, Jr. | 60/39.29 |
| 5,051,918 | 9/1991 | Parsons | 364/494 |

Primary Examiner—Richard A. Bertsch
Assistant Examiner—Howard R. Richman
Attorney, Agent, or Firm—Jerry J. Holden; Robert A. Walsh

[57] ABSTRACT

An on/off surge prevention control and method for a gas turbine engine having a variable geometry diffuser is provided. This control receives exhaust gas temperature and compressor discharge pressure signals from the engine, and a signal from the aircraft indicative of a need for bleed air. When the aircraft signal is received, the control opens the diffuser to its maximum open setting, and when said aircraft signal is absent closes said diffuser to its minimum open setting. In the event that a faulty aircraft signal is received, the control senses changes in EGT, P3 and dP3/dt and compares these parameters to preselected values indicative of the compressor nearing surge. When the measured values reach the preselected values, the control closes the diffuser to it minimum open setting. By using a temperature signal in determining when to close the diffuser, unwanted closings due to operating transients in compressor discharge pressure are provided. The control prevents the diffuser from being opened, until a second preselected EGT is reached. This second EGT is selected so that it cannot be reached by the engine so long as said aircraft signal is false.

17 Claims, 3 Drawing Sheets

ON/OFF SURGE PREVENTION CONTROL FOR A VARIABLE GEOMETRY DIFFUSER

CROSS-REFERENCE TO RELATED APPLICATION

This application, is related to copending U.S. patent application Ser. No. 07/806,565, which was filed concurrently. Both applications name the same inventors and are assigned to the same assignee.

TECHNICAL FIELD

This invention relates generally to controls and methods for gas turbine engines, and in particular to a control and method that opens and closes the area of a variable geometry diffuser to assure surge free operation as the engine transitions from one operating condition to another.

BACKGROUND OF THE INVENTION

In addition to their traditional propulsion functions, gas turbine engines are used as auxiliary power units aboard many types of aircraft to supply pneumatic power and/or shaft horsepower. A gas turbine auxiliary power unit includes in flow series arrangement a compressor, a bleed port, a combustor, and a turbine driving the compressor. A gearbox is drivingly coupled to the turbine and has a variety of aircraft accessories mounted thereto. Because the bleed port is disposed between the compressor and the combustor, these engines are referred to as integral bleed engines. When required, compressed air is bled through the bleed port and delivered to the aircraft where it is used in the environmental control system or for main engine starting. A load control valve is disposed in the bleed port to control the amount of bleed air. In an alternative configuration, a second compressor is operably coupled to the turbine and provides any required bleed flow. This type of configuration in referred to as a load compressor engine.

Regardless of the configuration, gas turbine auxiliary power units generally have two primary modes of operation. The first mode is maximum bleed flow in which the load control valve fully opens the bleed port and the maximum amount of compressed air is delivered to the aircraft. The second mode is maximum horsepower in which the control valve closes the bleed port and the horsepower generated by the engine is used to drive the accessories. As the engine transitions from the first mode to the second mode, the bleed port is closing which causes the pressure downstream of the compressor to rise. Should this pressure rise above the pumping capacity of the compressor, a surge will occur. During a surge, the direction of air flow in the compressor, reverses. This reversal of flow direction can be violent causing loud bangs and structural damage.

A conventional technique for preventing surge in these circumstances is to provide a surge valve within the bleed port. The surge valve is smaller than the load control valve and opens as the load control valve closes, thus limiting the rise of pressure downstream of the compressor. Unfortunately, the air bled through surge valve is dumped overboard. This dumped air is lost energy which must be compensated for by increasing the fuel flow to the combustor.

In order to eliminate the surge control valve and its associated losses, it has been proposed to employ a variable geometry diffuser within the compressor. It is well known in the art that variable geometry diffusers can improve an engine's power range and efficiency. With a variable geometry diffuser the engine can operate in the first mode with the diffuser in its maximum open setting and in the second mode with the diffuser in its minimum setting. However, even with a variable geometry diffuser the compressor can still be driven into a surge condition if the diffuser setting is not carefully adjusted as the engine transitions from the first mode to the second mode.

Accordingly, there is a need for a control and method that prevents compressor surge by adjusting the area of a variable geometry diffuser as the engine transitions from one operating condition to another.

Some aircraft manufactures desire to provide a signal to the auxiliary power unit when a change in the unit's operating conditions is required. For these aircraft a simple on/off the surge prevention control is provided that opens and closes the diffuser area in response to the aircraft signal. Additionally, the on/off control will close the diffuser in the event that it receives a faulty aircraft signal and a surge condition become imminent. Other manufacturers desire not to provide such signals. For these applications the surge prevention control must be self contained and able to modulate the diffuser area in response to a variety of measurements from sensors mounted in the gas turbine engine.

SUMMARY OF THE INVENTION

The object of the present invention is to provide a control and method that opens and closes a variable geometry diffuser to keep the compressor out of surge, in response to a signal from the aircraft or in the event that a faulty signal from the aircraft is received.

The subject invention accomplishes this object by providing a surge prevention control and method that receives a signal from the aircraft as well as temperature and pressure signals from the engine indicative of its operating conditions. In response to the aircraft signal, the control positions the diffuser in either its maximum open or minimum open settings. In the event of a faulty aircraft signal, the control closes the diffuser when the temperature and pressure signals indicate that the engine is operating close to a surge condition.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
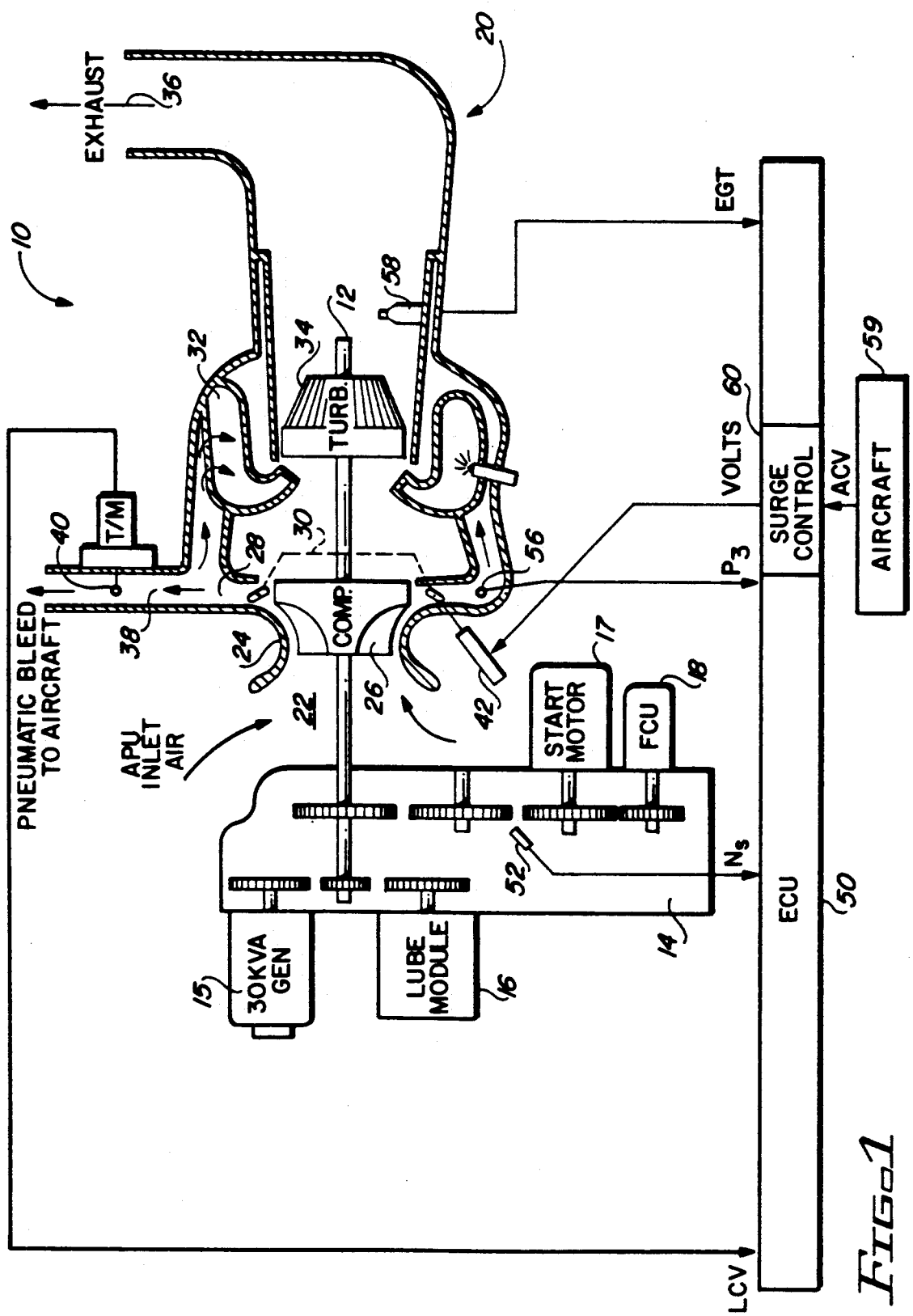
FIG. 1 is a schematic cross section of an exemplary auxiliary power unit having a variable geometry diffuser to which the surge prevention control of the present invention relates.

Referring to FIG. 1, an auxiliary power gas turbine engine to which the present invention relates is generally denoted by the reference numeral 10. For purposes of illustration, the engine 10 is depicted as an integral bleed engine even though the present invention is equally applicable to differently configured engines. The engine 10 includes an accessory gearbox 14 having mounted thereto an electric generator 15, a lube module 16, a start motor 17 and a fuel control unit 18.

The gas turbine engine 10 is comprised in flow series arrangement of an air inlet 22, a compressor 24, which includes an impeller 26 mounted for rotation on the shaft 12, and a variable geometry diffuser 28, a combustor 32, a turbine 34 operatively coupled to the impeller 26 via the shaft 12, and an exhaust gas outlet 36. The diffuser 28 has a plurality of circumferentially spaced, pivotable diffuser vanes 30. An integral bleed port 38 having a load control valve 40 for regulating the amount of bleed flow is disposed between the diffuser 28 and the combustor 32. Upon rotation of the shaft 12, air is inducted through the inlet 22 and pressurized in the compressor 24. The required bleed flow is bled off through the bleed port 38, with the remainder of the pressurized air entering the combustor 32 where it is mixed with fuel and ignited to form a hot, pressurized gas. This gas is then expanded across the turbine 34 to supply power to drive the compressor 24 and the accessory gearbox 14. An actuator 42, mounted to the engine 10, strokes the diffuser vanes 30 from a maximum open setting to a minimum open setting.

An electronic control unit (ECU), which may be analog or digital, governs the operation of the engine 10. The ECU 50 receives an engine speed signal Ns from a speed sensor 52 mounted in the gearbox 14, a compressor discharge pressure P3 from a pressure sensor 56 mounted downstream of the diffuser 28 and upstream of the bleed port 38, an exhaust gas temperature EGT from a thermocouple 58 mounted downstream of the turbine 34. An aircraft control unit 59 sends a command signal ACV to open or close aircraft valves which receive the bleed air from the engine 10. By way of example these valves can be any one of the following, a main engine starter valve, an environmental control system pack flow control valve, or a wing anti-ice valve. The ECU 50 also receives the ACV signal and in response, transmits a load control valve command signal, LCV, to open or close the load control valve 40.

Figure 2:
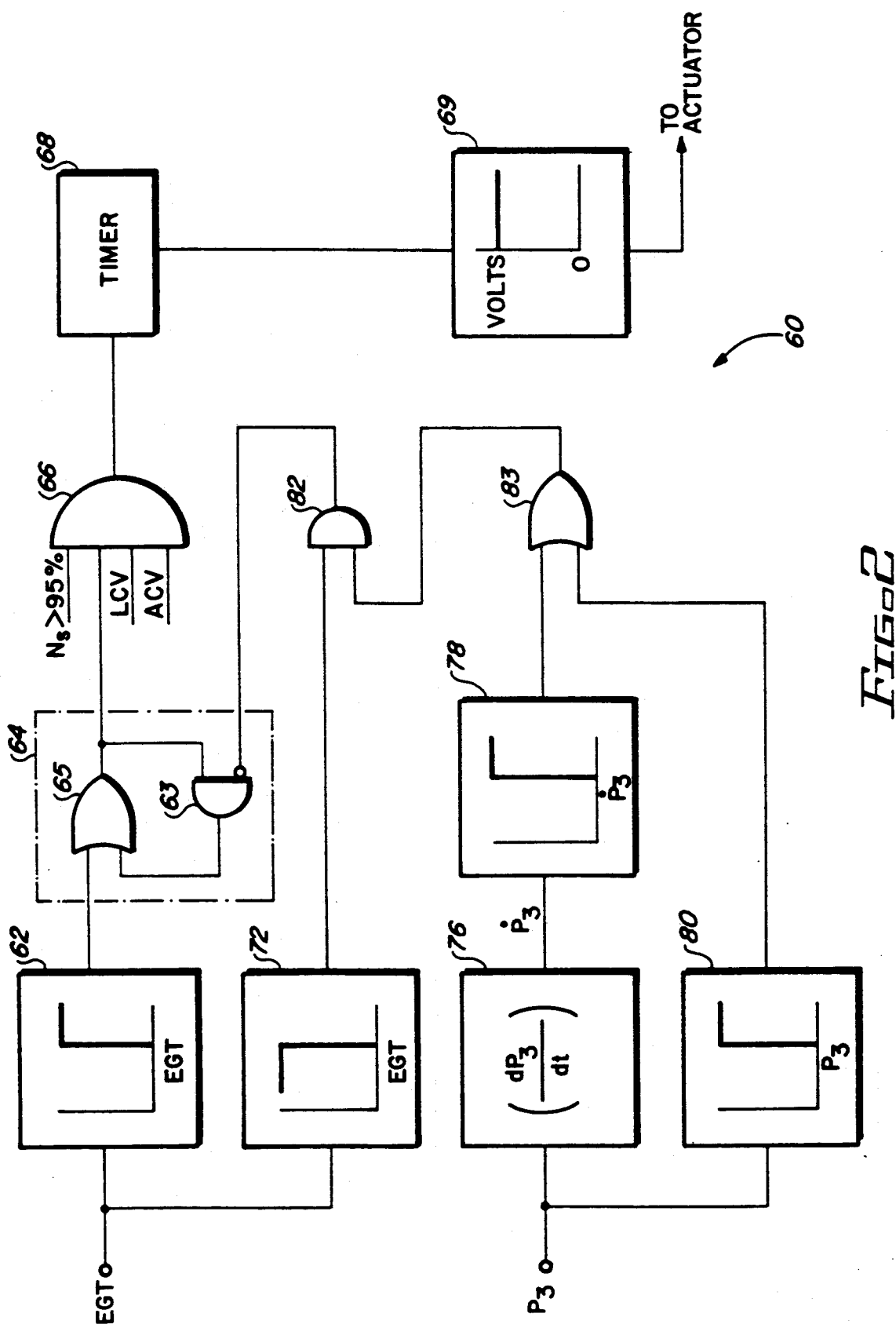
FIG. 2 is a block diagram of the surge prevention control for the auxiliary power unit of FIG. 1, that is responsive to a signal from the aircraft.

In the preferred embodiment of the present invention, the stroking of the diffuser vanes 30 by the actuator 42 is driven by a control means 60, illustrated diagrammatically in FIG. 2. The control means 60 is preferably electronically integrated within the ECU 50 and has means for receiving the Ns, P3, EGT, and ACV signals, and means for generating an on/off command signal to the actuator 42 to position the vanes 30 in either their maximum open setting or minimum open setting.

Figure 3:
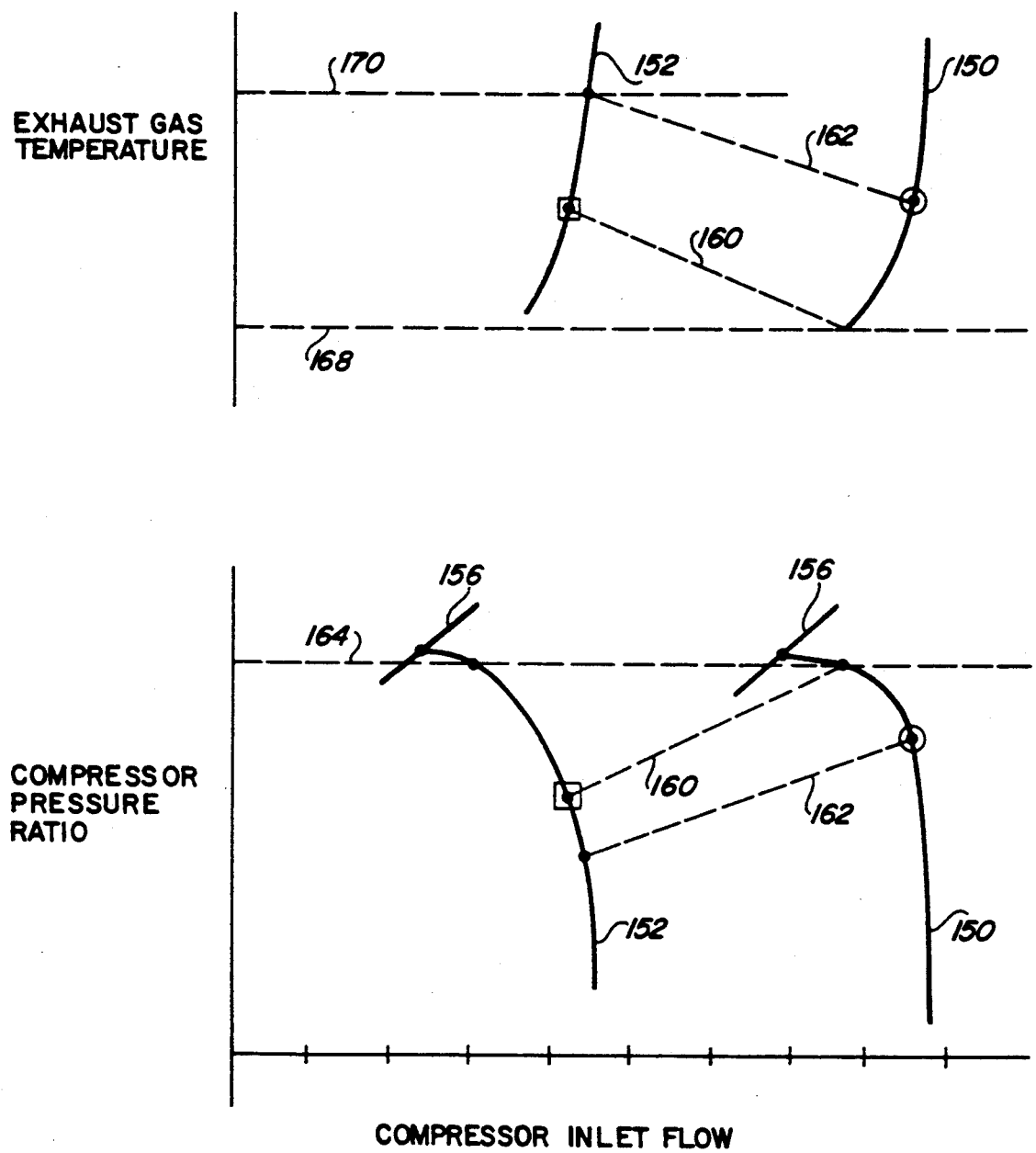
FIG. 3 is a compressor map for the auxiliary power unit of FIG. 1 showing compressor pressure ratio and exhaust gas temperature as a function of compressor inlet flow.

Referring to FIG. 2, within the control means 60, the EGT signal is received by a signal generator 62 which compares it to a preselected value represented by dashed line 170 in FIG. 3. If the received signal is greater than or equal to the preselected value 170 than the generator 62 transmits a first output signal which causes a latch 64 to latch. The latch 64 will unlatch in response to a signal from an AND gate 82 which is described in detail below. The latch 64 is conventional in design and includes AND gate 63 and an OR gate 65. While EGT is the preferred signal, other temperature signals could be used such as turbine inlet temperature.

An AND gate 66 receives the first output signal from the latch 64, the Ns signal, the LCV signal, and the ACV signal. If the Ns signal indicates that the engine 10 is not in a startup mode (i.e. the measured speed is preferably at or above 95 percent of full operating speed), and the LCV signal indicates the load control valve 40 is being commanded open, and the ACV signal indicates that at least one of the aircraft's valves is being commanded open the gating device 66 transmits the first output signal. A timer 68 delays the transmission of the first output signal by a half second before it is received by a signal generator 69 which generates a 28 volt ON signal for the actuator 42 which in this embodiment is preferably controlled by a solenoid valve (not shown). In response to this signal, the actuator 42 strokes the vanes 30 to their maximum open setting. Because the aircraft valves sometimes are slow in opening, to assure that these valves are open when the vanes 30 are opened, it is preferable to have this half second delay. In the absence of a signal from the AND gate 66, the actuator 42, in manner familiar to those skilled in the art, automatically strokes the vanes 30 to their minimum open setting.

A problem can arise when the AND gate 66 receives a faulty signal. For example, a faulty ACV signal that indicates that the aircraft valves are opened when in fact they are closed. To handle this situation, a signal generator 72 also receives the EGT signal and compares it to a preselected value represented by dashed line 168 in FIG. 3, and which is less than the preselected value 170. The preselected value 168 is analytically determined, in a manner familiar to those skilled in the art, to correspond to the operating point of the compressor 24 when it is operating in the vicinity of about six percent surge margin. If tee EGT is less than or equal to this second preselected value 168 then the generator 72 transmits a second output signal.

A rate generator 76 receives the P3 signal, and generates a signal having a magnitude representing the derivative over time of the P3 signal. A signal generator 78 receives this differentiated signal and generates a third output signal if the differentiated signal is greater than or equal to a preselected value.

A signal generator 80 also receives the P3 signal and compares it to a value which is preselected, in a manner known to those skilled, to assure a surge margin of six percent. If P3 is greater than or equal to this value the generator 80 sends a fourth output signal. If an OR gate 83 receives either the third output signal from signal generator 78 or the fourth output signal from the signal generator 80, it transmits a signal to the AND gate 82. When the AND gate 82 receives the second output signal from the signal generator 72 along with the signal from the OR gate 83, it transmits a signal to the latch 64 causing it to unlatch. Thus, the signal generator 69 ceases to transmit the on signal to the actuator 42 which, in the absence of this signal, will automatically set the vanes 30 to their minimum open setting. The vanes 30 will not be opened again until the EGT is high enough to cause the signal generator 62 to close the latch 64.

To illustrate what is happening to the engine 10 as the diffuser vanes 30 pivot in response to command from the control 60, FIG. 3 shows the operating characteristics of the compressor 24 having the variable geometry diffuser 28 in the form of a conventional compressor map which plots compressor pressure ratio and exhaust gas temperature as a function of compressor inlet air flow for lines of constant corrected rotational speed referred to as operating lines. An operating line 150 depicts the performance of the compressor 24 with the diffuser vanes 30 in their maximum open setting, while an operating line 152 depicts the performance of the compressor 24 when the diffuser vanes 30 are in their minimum open setting. Both operating lines 150 and 152 terminate at a surge line 156.

Starting with the compressor 24 operating in the first mode of operation, (maximum bleed flow, high EGT, diffuser vanes in their maximum open setting, and latch 64 latched), illustrated by the circle on operating line 150. During normal operation when the aircraft valves are commanded closed, the AND gate 66 ceases receiving the ACV signal and as already described the diffuser vanes 30 are automatically stroked to their minimum open setting. However, in the event of a faulty ACV signal into the AND gate 66 that indicates that the aircraft valves are open when in fact they are closing, the operating point of the compressor 24 will start to move up the operating line 150 toward the surge line 156. As this occurs, P3 and dP3/dt are increasing as EGT is decreasing. When the conditions in the signal generators 72, and 78 or 80 are satisfied, the latch 64 unlatches and the vanes 30 rotate to their minimum open setting before surge occurs. The transition from maximum open setting to minimum open setting is represented by the dashed line 160. With the vanes 30 in their minimum open setting, the compressor 24 is operating in the second mode of operation, (maximum shaft power, minimum or no bleed flow, low EGT, and latch 64 open), referenced by the square on operating line 152.

Continuing with the compressor operating in mode II, the ECU 50 commands the load control valve 40 to open in response to the command from the aircraft to open the aircraft valves. As the load control valve 40 opens, the compressor operating point moves down the operating line 152 and away from the surge line 156. As this occurs, EGT is rising until the signal generator 62 is activated causing the latch 64 to latch and the vanes 30 to be pivoted to their maximum open setting. The transition from minimum open setting to maximum open setting is represented by the dashed line 162. After the vanes 30 have been opened, the compressor 24 is once again in the first mode of operation. Note that if the ACV is still a faulty signal, EGT will never rise high enough to trigger an opening of the diffuser, avoiding a potential surge.

Thus, a simple control means 60 and method is provided that uses EGT as one determinant in preventing surge. The control means 60 is a simple on/off system that upon receipt of a signal from the aircraft, is activated to open the vanes 30 to their maximum setting. However, when a faulty aircraft signal or load control valve signal is received and the compressor 24 nears a surge condition, the control 60 sensing changes in EGT and P3, closes the vanes to their minimum open setting before a surge occurs. The use of EGT prevents the vanes 30 from closing during operating transients of the aircraft valves which may result in fluctuations in P3 or its derivative dP3/dt that would otherwise trigger an unwanted closing of the vanes 30. The control prevents the diffuser from opening until the opening can be accomplished without driving the compressor 24 into surge.

Various modifications and alterations to the above described preferred embodiment will be apparent to those skilled in the art. Accordingly, this description of of the invention should be considered exemplary in nature and not as limiting to the scope and spirit of the invention as set forth in the following claims.

What is claimed is:

1. A gas turbine engine for an aircraft comprising:
   a compressor including an impeller mounted for rotation on a shaft for inducting ambient air, and a variable geometry diffuser downstream of said compressor for diffusing the air exiting said impeller;
   a control valve mounted in a bleed port downstream of said diffuser for regulating the amount of bleed flow;
   a combustor receiving pressurized air and fuel, and for igniting said mixture to generate hot gases;
   a turbine mounted for rotation to said shaft and driven by said hot gases from said combustor;
   a gearbox coupled to said shaft and having at least one accessory mounted thereto;
   a plurality of sensors mounted at preselected locations in said engine; and
   a control unit for governing the operation of said engine in response to said sensors, said control unit including an on/off surge prevention control that is on when a signal from said aircraft indicating that bleed flow is required is received, said surge prevention control setting said area of said diffuser to its maximum open setting in response thereto, and is off, in the absence of said aircraft signal, said surge prevention control resetting said area of said diffuser to its minimum open setting in response thereto.

2. The gas turbine engine of claim 1 wherein said variable geometry diffuser includes a plurality of circumferentially spaced, pivotable diffuser vanes positionable between a maximum open setting and a minimum open setting.

3. The gas turbine engine of claim 1 wherein said surge prevention control further includes means for closing said diffuser when said control receives a faulty aircraft signal and said compressor nears surge.

4. The gas turbine engine of claim 3 wherein said surge prevention control further includes means for preventing said diffuser from opening when said control is receiving a faulty aircraft signal.

5. A surge prevention control for a gas turbine engine mounted in an aircraft and having a compressor having a variable geometry diffuser that is positionable between a maximum open setting and minimum open setting, comprising:
   a first control loop for generating a control signal to said diffuser, said first control loop causing said diffuser to open in response to a signal from said aircraft and to close absent said aircraft signal; and
   a second control loop that receives a signal from at least one sensor mounted in said engine and which causes said diffuser to close when said first control loop receives a faulty aircraft signal and said sensor indicates that said compressor is near surge.

6. The surge prevention control of claim 5 wherein said first control loop include means for preventing said diffuser from opening while said faulty aircraft signal is being received.

7. A surge prevention control for a gas turbine engine with a compressor having a variable geometry diffuser that is positionable between a maximum open setting and minimum open setting, comprising:

first signal generator means for receiving a signal representative of the gas temperature in said engine and for generating a first output signal when said temperature is greater than or equal to a first preselected temperature stores within said first generator means;

second signal generator means for receiving said temperature signal and for generating a second output signal when said temperature signal is less than or equal to a second preselected temperature stored with in said second signal generator means, said second preselected temperature being less than said first preselected temperature;

control means for receiving a signal representative of said compressor discharge pressure and transmitting an output signal having a magnitude representing the differential, as a function of time, of the magnitude of said pressure signal;

third signal generator means for receiving said differentiated pressure signal and for generating a third output signal when said differentiated pressure is greater than or equal to a preselected differentiated pressure stored in said third generator means;

fourth signal generator means for receiving said pressure signal and for generating a fourth output signal when said pressure signal is greater than or equal to a preselected pressure stored in said fourth generator means;

first gating means for transmitting a fifth output signal only after receiving said second, third and fourth output signals;

latch means for latching in response to said first output signal and for unlatching in response to said fifth output signal;

second gating means for receiving a signal from said latch means when said latch means is latched, and for transmitting said signal when said second gating means also receives both a signal indicating that said engine is at its operating speed and a signal indicating that bleed flow is required from said engine; and second control means for receiving said signal from said second gating means and for generating a control signal to said diffuser.

8. A method for preventing surge of a gas turbine engine compressor having a variable geometry diffuser that is positionable between a maximum open setting and minimum open setting, comprising the steps of:

receiving a signal representative of a gas temperature in said engine;

comparing said temperature signal to a first preselected temperature; and closing said diffuser when said temperature signal is less than or equal to said first preselected temperature.

9. The method of claim 8 further comprising the steps of;

comparing said temperature signal to a second preselected temperature, said second preselected temperature being greater than said first preselected temperature; and opening said diffuser when said temperature signal is greater than or equal to said second preselected temperature.

10. The method of claim 9 wherein said step of closing closes said diffuser to its minimum open setting and said step of opening opens said diffuser to its maximum open setting.

11. The method of claim 8 wherein said step of closing further includes the steps of:

receiving a signal representative of the discharge pressure of said compressor;

calculating a rate of change of said pressure signal with respect to time;

comparing said rate of change to a preselected rate;

closing said diffuser when said rate of change is greater than or equal to said preselected rate and said temperature signal is less than or equal to said first preselected temperature.

12. The method of claim 8 wherein said step of closing further includes the steps of:

receiving a signal representative of the discharge pressure of said compressor;

comparing said pressure signal to a preselected pressure; and closing said diffuser when said pressure signal is greater than or equal to said preselected pressure and said temperature signal is less than or equal to said first preselected temperature.

13. The method of claim 12 further comprising the step of selecting said preselected pressure and temperature to be representative of said engines operating conditions when said diffuser is at its maximum open setting and said compressor is operating near surge.

14. The method of claim 8 wherein said step of closing further includes the steps of:

receiving a signal representative of the discharge pressure of said compressor;

calculating a rate of change of said pressure signal with respect to time;

comparing said pressure signal to a preselected pressure;

comparing said rate of change to a preselected rate;

closing said diffuser when said pressure signal is greater than or equal to said preselected pressure and/or said rate of change is greater than or equal to said preselected rate and said temperature signal is less than or equal to said first preselected temperature.

15. The method of claim 9 wherein said step of opening further includes the steps of;

receiving a signal indicating that said engine is at its operating speed;

receiving a signal indicating that bleed flow is required from said engine; and opening said diffuser only after said speed signal and said bleed signal have been received and said temperature signal is greater than or equal to said second preselected temperature.

16. The method of claim 15 whereby said step of receiving said bleed signal includes the steps of receiving a signal indicating that said engine's load control valve is opening and receiving a signal from an aircraft, in which said engine is operably mounted, indicating that said aircraft is able to receive bleed air from said engine.

17. The method of claim 15 further including the step of delaying said opening step for a predetermined amount of time.

* * * * *